United States Patent
Venkumahanti et al.

(10) Patent No.: US 8,874,884 B2
(45) Date of Patent: Oct. 28, 2014

(54) SELECTIVE WRITING OF BRANCH TARGET BUFFER WHEN NUMBER OF INSTRUCTIONS IN CACHE LINE CONTAINING BRANCH INSTRUCTION IS LESS THAN THRESHOLD

(75) Inventors: Suresh K. Venkumahanti, Austin, TX (US); Lucian Codrescu, Austin, TX (US); Suman Mamidi, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 13/289,007

(22) Filed: Nov. 4, 2011

(65) Prior Publication Data

US 2013/0117535 A1 May 9, 2013

(51) Int. Cl.
*G06F 9/38* (2006.01)

(52) U.S. Cl.
CPC ............ *G06F 9/3806* (2013.01); *G06F 9/3844* (2013.01)
USPC .......................................... 712/238; 712/240

(58) Field of Classification Search
CPC .... G06F 9/3844; G06F 9/3806; G06F 8/4451
See application file for complete search history.

(56) References Cited

U.S. PATENT DOCUMENTS

| | | | |
|---|---|---|---|
| 6,052,776 A | 4/2000 | Miki et al. | |
| 7,124,287 B2 | 10/2006 | Prasky et al. | |
| 7,447,883 B2 * | 11/2008 | Vasekin et al. ................ | 712/238 |
| 7,937,573 B2 | 5/2011 | Moyer et al. | |
| 2005/0216713 A1 | 9/2005 | Prasky et al. | |
| 2008/0040590 A1 | 2/2008 | Lee et al. | |
| 2010/0031010 A1 | 2/2010 | Moyer et al. | |
| 2011/0107071 A1 | 5/2011 | Jacob | |

OTHER PUBLICATIONS

Burcea, Ioana et al. "Phantom-BTB: A Virtualized Branch Target Buffer Design," Fourteenth International Conference on Architectural Support for Programming Languages and Operating Systems (ASPLOS '09), Mar. 7-11, 2009, Washington, D.C., 11 pages.
Hu, Yau-Chong et al. "Low-Power Branch Prediction," http://academic.research.microsoft.com/Publication/1904787/low-power-branch-prediction, printed Jul. 5, 2011, 2 pages.
Parikh, Dharmesh et al. "Power Aware Branch Prediction: Characterization and Design," http://academic.research.microsoft.com/Publication/1419548/power-aware-branch-prediction-characterization-and-design, printed Jul. 5, 2011, 3 pages.
International Search Report and Written Opinion—PCT/US2012/063581—ISA/EPO—Mar. 4, 2013.

* cited by examiner

*Primary Examiner* — Kenneth Kim
(74) *Attorney, Agent, or Firm* — Peter Michael Kamarchik; Nicholas J. Pauley; Joseph Agusta

(57) ABSTRACT

A method includes executing a branch instruction and determining if a branch is taken. The method further includes evaluating a number of instructions associated with the branch instruction. Upon determining that the branch is taken, the method includes selectively writing an entry into a branch target buffer that corresponds to the taken branch responsive to determining that the number of instructions is less than a threshold.

16 Claims, 4 Drawing Sheets

SELECTIVE WRITING OF BRANCH TARGET BUFFER WHEN NUMBER OF INSTRUCTIONS IN CACHE LINE CONTAINING BRANCH INSTRUCTION IS LESS THAN THRESHOLD

I. FIELD

The present disclosure is generally related to selectively writing to a branch target buffer (BTB).

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

As the computing capabilities of electronic devices such as wireless telephones increase, the complexity of instructions to implement software applications also increases. An increase in the complexity and number of instructions may result in a need for increased performance of the processor. Thus, modern processors may use pipelining of instructions to increase performance. Branch instructions (or branches) are often used in computer programs and branch instructions may reduce the performance of a pipelined processor because the branch instructions may alter the program flow. Examples of branches include conditional statements, if-then-else structures, conditional jumps, goto instructions, etc. A branch may be "taken" or "not taken." When a branch is taken, the program flow is changed because the next instruction may be non-sequential and may be defined by execution of the branch instruction. When a branch is not taken, the program flow is unchanged because the next instruction executed may be the instruction immediately following the branch instruction (i.e., sequential).

Branch prediction may be used to predict whether a branch instruction will be taken or not taken. Instructions corresponding to the branch that is predicted to be taken are fetched and speculatively executed to keep the pipeline busy and to prevent stalling. If it is later detected that the prediction was wrong, then the speculatively executed or partially executed instruction(s) are discarded and the pipeline may execute instructions of the correct branch or may accept the results of executing the instructions of the correct branch. Branch prediction may thus increase the number of instructions available for a scheduler to issue and may increase instruction level execution parallelism because branch prediction allows useful work to be completed while waiting for a branch to resolve.

A branch target buffer (BTB) may be used to facilitate branch prediction. The BTB may be used to store a program counter (PC) address (i.e., branch address) of a particular branch instruction and a predicted target address for the branch. By predicting a branch instruction at an instruction fetch (IF) stage, target instruction(s) for the branch instruction may be fetched after the branch instruction has been processed in the IF stage and before the branch instruction enters the execution stage, thereby keeping the pipeline busy and increasing efficiency.

Conventional BTBs store the above described information (i.e., branch address and target address) for every branch instruction taken. Thus, the BTB may grow in size leading to increased time to access the information stored at the BTB and an increase in power consumption. One technique proposes using two BTBs to improve access time (i.e., a first BTB that stores the most frequently taken branch instructions and a second BTB that stores less frequently taken branch instructions), where the size of the second BTB is larger than the size of the first BTB. However, this technique requires using additional memory space to store the two BTBs. Further, BTB access time may still be large for the second BTB.

III. SUMMARY

A method of selectively writing information (i.e., branch address and target address) to a BTB when certain conditions are met is disclosed. The method does not write information regarding every branch instruction to the BTB. Thus, a smaller BTB size may be achieved leading to an improved BTB access time and a reduction in power consumption of the processor associated with the BTB access, without reduction in performance of the BTB.

If a fetch latency of a processor is N cycles, where N is an integer greater than 0, then the processor may take N cycles to fetch a cache line, where each cache line may contain one or more instruction packets, each instruction packet containing one or more instructions. In such a situation, each fetched line of instructions should preferably include N instructions, so that a pipeline that accepts N instructions per cycle remains busy while the next line of instructions is fetched. In this case, target information need not be written to the BTB because the pipeline is kept busy and does not stall while the branch instruction is executed. However, some branch instructions may be located in a line (i.e., as a part of a line) that includes fewer than N instructions. For such instances, target information may be written to the BTB so that when the branch instruction is encountered again, the target information (i.e., target address) written to the BTB may be fetched before the branch instruction enters the execution stage, thereby keeping the pipeline busy and increasing efficiency. Because the BTB is selectively written to (i.e., written to when a line of instructions having a branch instruction includes less than N instructions, but not written to when a line of instructions having a branch instruction includes N or more instructions), a smaller BTB size may be achieved, leading to an improved BTB access time and a reduction in power consumption associated with BTB access.

In a particular embodiment, a method includes executing a branch instruction and determining if a branch is taken. The method further includes evaluating a number of instructions associated with the branch instruction. Upon determining that the branch is taken, the method also includes selectively writing an entry into a branch target buffer that corresponds to the taken branch responsive to determining that the number of instructions is less than a threshold.

In another particular embodiment, an apparatus includes a branch target buffer, an instruction cache that stores a plurality of instructions including a branch instruction, and a processor to execute the branch instruction. The processor includes control logic to evaluate a plurality of instructions including the branch instruction fetched from the instruction cache and to determine if a branch is taken. Upon determining that the branch is taken, the control logic selectively writes an entry into the branch target buffer that corresponds to the taken branch responsive to determining that a number of instructions including the branch instruction fetched from the instruction cache is less than a threshold.

In another particular embodiment, an apparatus includes means for executing a branch instruction and determining if a branch is taken. The apparatus also includes means for evaluating a number of instructions associated with the branch instruction (e.g., the number of instructions in a cache line that includes the branch instruction). The apparatus further includes means for selectively writing an entry into a branch target buffer that corresponds to the taken branch upon determining that the branch is taken and responsive to determining that the number of instructions is less than a threshold.

In another particular embodiment, a non-transitory computer-readable medium includes program code that, when executed by a processor, causes the processor to execute a branch instruction and determine if a branch is taken and to evaluate a number of instructions associated with the branch instruction. Upon determining that the branch is taken, the program code further causes the processor to selectively write an entry into a branch target buffer that corresponds to the taken branch responsive to determining that the number of instructions is less than a threshold.

One particular advantage provided by at least one of the disclosed embodiments is a reduction in BTB size, which may lead to an improved BTB access time. A reduction in BTB size may also lead to reduction in power consumption associated with the BTB.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
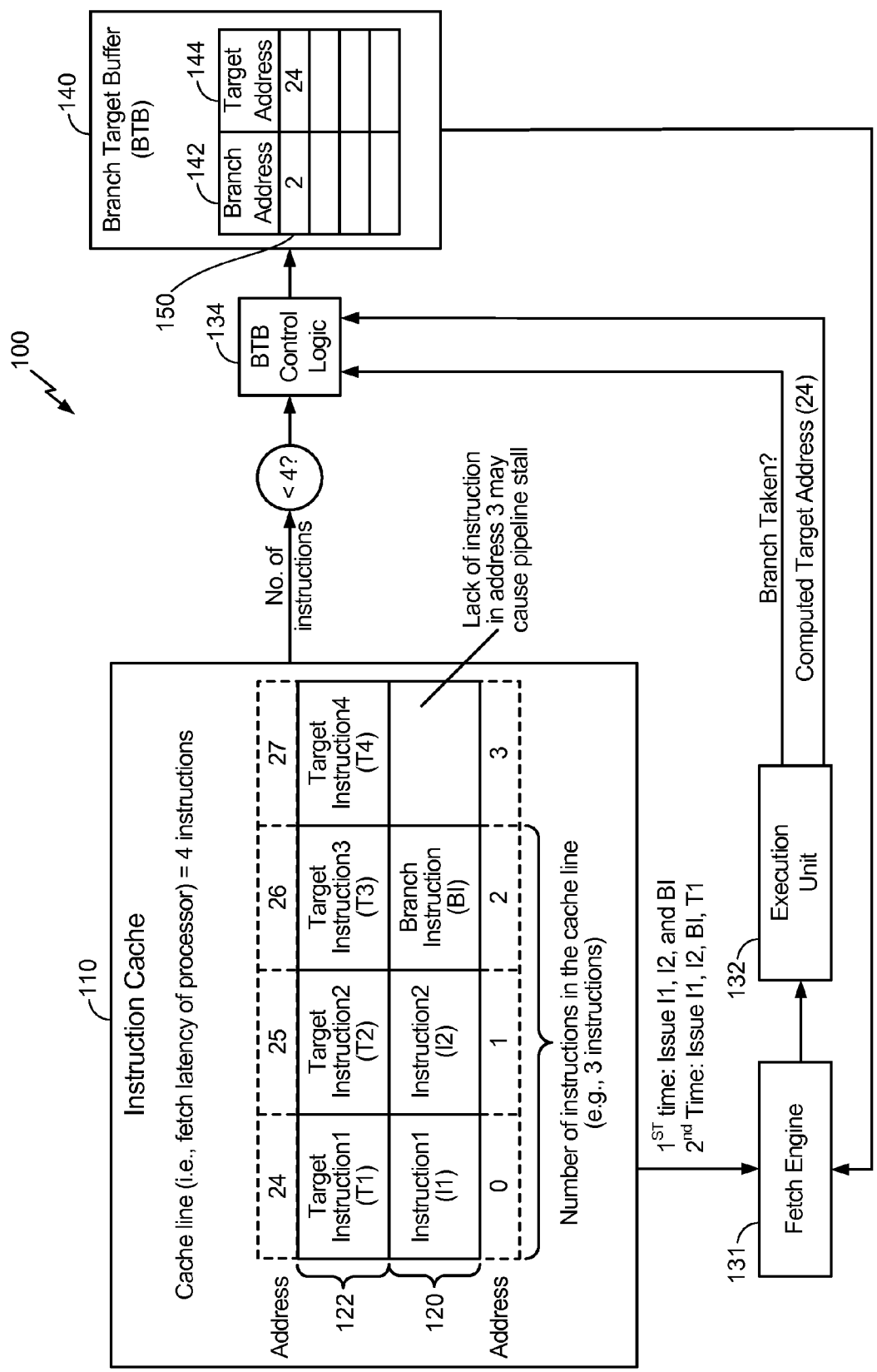
FIG. 1 is a diagram that illustrates executing a branch instruction and selectively writing an entry into a branch target buffer.

Referring to FIG. 1, a particular illustrative example of execution of a branch instruction is disclosed and generally designated 100.

FIG. 1 illustrates an instruction cache 110 coupled to a fetch engine 131 and to branch target buffer (BTB) control logic 134. The BTB control logic 134 may be coupled to a BTB 140 and the fetch engine 131 may be coupled to an execution unit 132. In a particular embodiment, the fetch engine 131, the execution unit 132, the BTB control logic 134, and the BTB 140 may be included in a processor (not shown). The instruction cache 110 may include a representative cache line 120 having a maximum number of instructions corresponding to a fetch latency of the processor. For example, if the fetch latency of the processor is N cycles, then the processor may take N cycles to fetch a line of instructions (e.g., encapsulated in one or more instruction packets) from the instruction cache 110. Thus, every fetch (e.g., fetch of the cache line 120) may provide N instructions. The fetch engine 131 may fetch instructions (e.g., cache line 120, 122) from the instruction cache 110 and send the instructions to the execution unit 132. The execution unit 132 may be coupled to the BTB control logic 134. The BTB 140 may store one or more entries corresponding to a taken branch that are selectively written to the BTB 140 by the BTB control logic 134. Each of the one or more entries of the BTB 140 may include a branch address 142 of a branch instruction and a target address 144 of a target instruction of the branch instruction. For example, as shown in FIG. 1, an entry 150 of the BTB 140 includes branch address 2 corresponding to the address of branch instruction (BI) and target address 24 corresponding to the address of target instruction 1 (T1).

As illustrated, the fetch engine 131 of FIG. 1 may have the capacity to fetch the cache line 120 that may have up to 4 instructions and the processor may be able to process the 4 instructions in 4 execution cycles (i.e., 1 instruction per cycle). Note that the 4 instruction line is an example only. Different processors may have different cache line sizes and fetch latencies. At a first illustrative time, the cache line 120 may include instruction 1 designated I1, instruction 2 designated I2, and the branch instruction designated BI, located at addresses 0, 1, and 2, respectively. Accordingly, a lack of an instruction in address 3 of the cache line 120 may cause a pipeline stall in the processor. Thus, in cases where the cache line 120 includes fewer instructions (e.g., 3 instructions or less) than the cache line capacity (e.g., 4), there may be a stall in the pipeline because the process is idle due to a lack of an instruction being issued while a branch target is computed.

During operation at a first time, the instruction cache 110 may provide information regarding the number of instructions in the cache line 120 to the BTB control logic 134. For example, the instruction cache 110 may inform the BTB control logic 134 that there are 3 instructions (i.e., I1, I2, and BI) in the cache line 120. The BTB control logic 134 may compare the number of instructions in the cache line 120 that includes the branch instruction (BI) to a threshold (e.g., the fetch latency of the processor=4). Further, the fetch engine 131 may fetch and issue instructions I1, I2, and BI from the cache line 120 to the execution unit 132. Upon execution of the branch instruction BI, the execution unit 132 may determine whether or not the branch is taken and provide this information to the BTB control logic 134. In addition, the execution unit 132 may also compute a target address (e.g., 24 for target instruction T1) for the taken branch and provide this information to the BTB control logic 134.

The BTB control logic 134 may be configured to selectively write an entry (e.g., entry 150) to the BTB 140. For example, the BTB control logic 134 may write the entry 150 to the BTB 140 upon determining that the number of instructions in the cache line 120 (i.e., 3) having the branch instruction (BI) is less than the threshold (i.e., 4) and in response to determining that the branch is taken. The entry 150 may include the branch address (i.e., 2) of the branch instruction (BI) and the target address (i.e., 24) of the computed target address provided by the execution unit 132. Conversely, if the BTB control logic 134 determines that the number of instructions in the cache line 120 having the branch instruction (BI) is greater than or equal to the threshold (i.e., > or =4), then the BTB control logic 134 may not write an entry into the BTB 140. In this case, the BTB control logic 134 may not write an entry because the processor pipeline will be kept busy (i.e., no stalling) because at least one of the 4 or more instructions will be issued while the branch target address is calculated without a need for branch prediction.

During operation at a second time, when the branch instruction (BI) is encountered again, the cache line 122 including the target instruction T1 may be fetched based on information provided by the BTB 140 (e.g., the BTB entry 150 may be used as an input to the fetch engine 131, as illustrated, to determine the target address (24)) as soon as possible (e.g., due to detecting a "hit" in the BTB 140 for the address 2 of the branch instruction BI) to prevent the processor from stalling, as may have otherwise occurred because the branch instruction BI was located in a cache line 120 having fewer than 4 instructions. In a particular embodiment, after writing the entry into the BTB 140 at the first time, control logic within the system 100 (e.g., the fetch engine 131) may fetch a line of instructions (e.g., by fetching one or more instruction packets where each instruction packet includes one or more instructions) that includes the branch instruction BI and upon determining that the branch instruction corresponds to the entry 150 in the BTB 140, the fetch engine 131 may also fetch one or more instructions corresponding to the target address (e.g., address 24) of the taken branch. Thus, at the second time, the fetch engine 131 may fetch and issue instruction 1 I1, instruction 2 I2, the branch instruction BI, and the target instruction T1, thereby preventing pipeline stall. The address of the target instruction T1 may be determined based on the entry 150 in the BTB 140 and fetched along with the branch instruction BI at an instruction fetch stage instead of after the branch instruction BI has been executed. By selectively writing entries corresponding to a branch address and a target address into the BTB 140, a smaller BTB 140 size may be achieved. A reduction in size of the BTB 140 may lead to an improved BTB 140 access time and a reduction in power consumption related to BTB 140 access.

Figure 2:
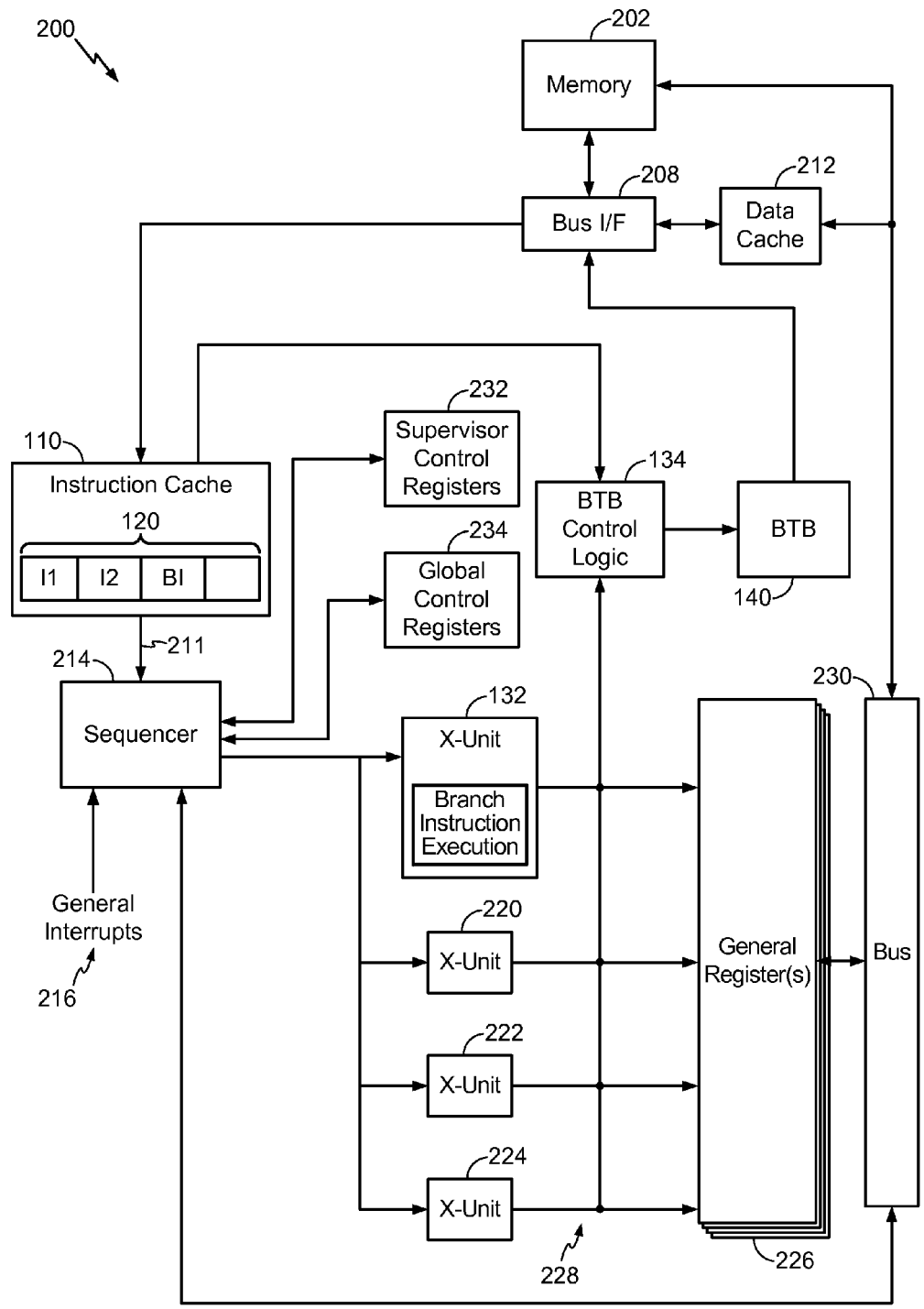
FIG. 2 is a diagram of a particular illustrative embodiment of a system that includes an instruction cache storing a branch instruction and a processor to execute the branch instruction and to selectively write to a branch target buffer.

Referring to FIG. 2, particular illustrative embodiment of a system including an instruction cache 110 storing a plurality of instructions including a branch instruction BI, an execution unit 132 to execute the branch instruction, and branch target buffer (BTB) control logic 134 to selectively write to a BTB 140 is disclosed and generally designated 200. The system 200 includes a memory 202 that may be coupled to the instruction cache 110 via a bus interface 208. In a particular embodiment, all or a portion of the system 200 may be integrated into a processor. Alternately, the memory 202 may be external to the processor. In a particular embodiment, the instruction cache 110 may include multiple instructions including a cache line 120 that includes instruction 1 I1, instruction 2 I2, and the branch instruction BI (i.e., 3 instructions).

The memory 202 may send the instructions I1, I2, and BI to the instruction cache 110 via the bus interface 208. A data cache 212 may also be coupled to the memory 202 via the bus interface 208. The instruction cache 110 may be coupled to a sequencer 214 via a bus 211. The sequencer 214 may receive general interrupts 216, which may be retrieved from an interrupt register (not shown). In a particular embodiment, the instruction cache 110 may be coupled to the sequencer 214 via a plurality of current instruction registers (not shown), which may be coupled to the bus 211 and associated with particular threads (e.g., hardware threads) of the processor 200. In a particular embodiment, the processor 200 may be an interleaved multi-threaded processor including six (6) threads.

In a particular embodiment, the bus 211 may be a one-hundred and twenty-eight bit (128-bit) bus and the sequencer 214 may be configured to retrieve instructions from the memory 202 via instruction packets that include multiple instructions (e.g., an instruction packet that includes instructions I1, I2, and BI) having a length of thirty-two (32) bits each. The bus 211 may be coupled to a first instruction execution unit 132 (e.g., the execution unit 132), a second instruction execution unit 220, a third instruction execution unit 222, and a fourth instruction execution unit 224. It should be noted that there may be fewer or more than four instruction execution units. Each instruction execution unit 132, 220, 222, and 224 may be coupled to the general register file 226 via a first bus 228. The general register file 226 may also be coupled to the sequencer 214, the data cache 212, and the memory 202 via a second bus 230.

The system 200 may also include supervisor control registers 232 and global control registers 234 to store bits that may be accessed by control logic within the sequencer 214 to determine whether to accept interrupts (e.g., the general interrupts 216) and to control execution of instructions. The system 200 may also include the BTB control logic 134 and the BTB 140, which are coupled as shown. In a particular embodiment, the BTB control logic 134 may selectively write an entry into the BTB 140, where the entry includes an address of a taken branch and a target address corresponding to the taken branch.

In a particular embodiment, a fetch engine (not shown) may fetch instruction packets including a plurality of instruction (e.g., the illustrative instruction packet having instructions I1, I2, and BI) from the instruction cache 110 and may issue the instructions of the cache line 120 to any of the execution units 132, 220, 222, and 224. For example, the execution unit 132 may receive and execute the branch instruction BI and two of the remaining execution units (e.g., execution units 220 and 222) may receive and execute the instructions I1 and I2. In a particular embodiment, the execution unit 132 may execute the branch instruction BI and determine that the branch is taken and may also compute a target address for the taken branch. Further, the instructions I1 and I2 may be executed in parallel by the execution unit 220 and the execution unit 222, respectively. Moreover, the branch instruction BI, the instruction I1 and the instruction I2 may be executed by the execution units 132, 220, and 222 during the same clock cycle.

The BTB control logic 134 may receive an indication from the execution unit 132 that the branch is taken for the branch instruction BI along with the computed target address for the taken branch. Further, the BTB control logic 134 may receive information indicating the number of instructions in the cache line 120 from the instruction cache 110. The BTB control logic 134 may determine if the number of instructions in the cache line 120 is less than a threshold. For example, the threshold may be determined based on a fetch latency of the processor 200 and the number of instructions may be determined from the number of instructions in the cache line 120 that includes the branch instruction BI. In a particular embodiment, the BTB control logic 134 may selectively write an entry into the BTB 140. For example, upon determining that the branch is taken and that the number of instructions (e.g., 3) in the cache line 120 that includes the branch instruction BI is less than the threshold (e.g., 4), the BTB control logic 134 may write an entry into the BTB 140. For example, the entry may include the address of the branch instruction and the computed target address corresponding to the taken branch.

Thus, the system 200 of FIG. 2 may allow for an overall size of the BTB 140 to be reduced by selectively writing to the BTB 140 when certain conditions are met. A reduction in the overall size of the BTB may lead to improved BTB access time and a reduction in power consumption of the BTB.

Figure 3:
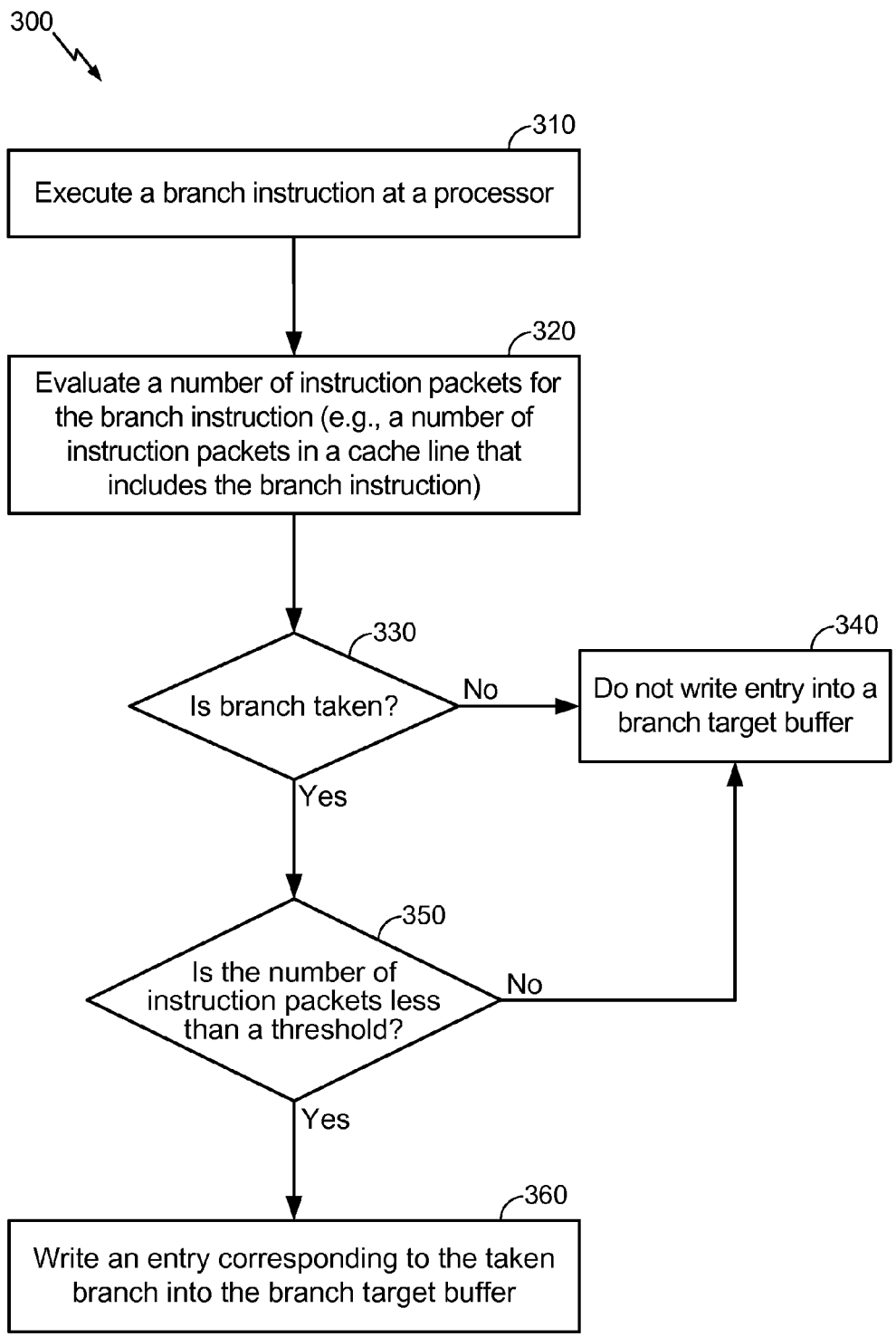
FIG. 3 is a flow chart of a particular illustrative embodiment of a method of executing a branch instruction and selectively writing an entry into a branch target buffer.

Referring to FIG. 3, a particular illustrative embodiment of a method of executing a branch instruction and selectively writing an entry into a branch target buffer (BTB) is disclosed and generally designated 300. In an illustrative embodiment, the method 300 may be performed at the system 200 of FIG. 2 and may be illustrated with reference to FIG. 1.

The method 300 may include executing a branch instruction at a processor, at 310. For example, the branch instruction may be stored at the instruction cache 110 of FIG. 1 or FIG. 2 or the memory 202 of FIG. 2. The branch instruction may be the branch instruction BI included in the cache line 120 of FIG. 1 or FIG. 2. The cache line 120 may also include other instructions (e.g., instructions I1 and I2). The memory 202 may be a register-based memory, a random access memory (RAM), or any combination thereof. Further, the branch instruction may be executed by any of the execution units 132, 220, 222, and 224 of FIG. 2. To illustrate, the execution unit 132 may execute the branch instruction BI, the execution unit 220 may execute the instruction I1, and the execution unit 222 may execute instruction I2 in parallel with and in the same clock cycle as execution of the branch instruction BI.

The method 300 may also include evaluating a number of instructions in the instruction packet containing the branch instruction, at 320. For example, the BBT control logic 134 of FIG. 1 or FIG. 2 may receive an indication of the number of instructions in the cache line 120 that includes the branch instruction BI from the instruction cache 110. To illustrate, the BTB control logic 134 may determine that the number of instructions in the cache line 120 is three (i.e., instruction I1, instruction I2, and branch instruction BI).

The method 300 may also include determining if a branch is taken, at 330. For example, the execution unit 132 may execute the branch instruction BI and determine that the branch is taken. If it is determined that the branch is not taken, the BTB control logic 134 does not write an entry into the BTB 140, at 340. If however, it is determined that the branch is taken, the method 300 proceeds to 350. Thus, upon determining that the branch is taken, the BTB control logic 134 may selectively write an entry into the BTB 140 that corresponds to the taken branch. For example, the execution unit 132 may compute the target address for the taken branch and provide information regarding the determination that the branch is taken and the computed target address to the BTB control logic 134.

The method 300 includes determining if the number of instructions is less than a threshold, at 350. For example, the BTB control logic 134 may compare the number of instructions in the cache line 120 that includes the branch instruction BI to the threshold value (e.g., 4). In a particular embodiment, the threshold value is determined based on a fetch latency of the processor 200 of FIG. 2. As illustrated in FIGS. 1 and 2, the cache line 120 includes 3 instructions. Because the cache line includes fewer instructions than a threshold based on the fetch latency of the processor, the pipeline of the processor may stall.

If it is determined that the number of instructions is not less than the threshold, the method 300 continues to 340, and no entry is written into the BTB 140. For example, when the BTB control logic 134 determines that the number of instructions in the cache line 120 that includes the branch instruction BI is greater than or equal to 4 instructions, then no entry is written to the BTB 140 because the pipeline of the processor will be kept busy while the branch target is calculated. Thus, an entry is not written into the BTB 140 that corresponds to the taken branch because there will be no stalling in the pipeline.

However, if it is determined that the number of instructions is less than the threshold, the method 300 includes writing an entry corresponding to the taken branch into the branch target buffer, at 360. For example, if the BTB control logic 134 determines that the taken branch is the result of a branch instruction in a cache line having 1, 2, or 3 instructions (i.e., less than the fetch latency), information on the taken branch (e.g., the branch address and the target address) may be written to the BTB 140. Hence, when the branch instruction BI is encountered again, target instruction(s) (e.g., target instruction T1 from address 24) may be fetched to prevent the pipeline from stalling, as may have otherwise occurred because the branch instruction BI was located in a cache line having fewer than 4 instructions. In a particular embodiment, after writing the entry 150 (i.e., the branch instruction BI address and the computed target address) into the BTB 140, a line of instructions that includes the branch instruction BI may be fetched (e.g., by the fetch engine 131 of FIG. 1) for processing by the execution unit 132 (e.g., in a subsequent instruction fetch cycle of the processor 200). Upon determining that the branch instruction corresponds to the entry 150 in the BTB 140 (e.g., by detecting a "hit" in the BTB 140 corresponding to the branch instruction BI), the target address (e.g., address 24) corresponding to the taken branch may be fetched.

The method 300 of FIG. 3 may be implemented by a field-programmable gate array (FPGA) device, an application-specific integrated circuit (ASIC), a processing unit such as a central processing unit (CPU), a digital signal processor (DSP), a controller, another hardware device, firmware, or any combination thereof. As an example, the method 300 of FIG. 3 can be performed by a processor or component thereof that executes program code or instructions, as described with respect to FIGS. 2 and 4. The method 300 of FIG. 3 may thus enable selective writing of entries to the BTB 140 when the number of instructions in the cache line 120 is less than the threshold and not simply write entries to the BTB 140 for all branch instructions that evaluate as taken. This may result in a smaller BTB size and lead to an improved BTB access time and a reduction in power consumption by the BTB.

Figure 4:
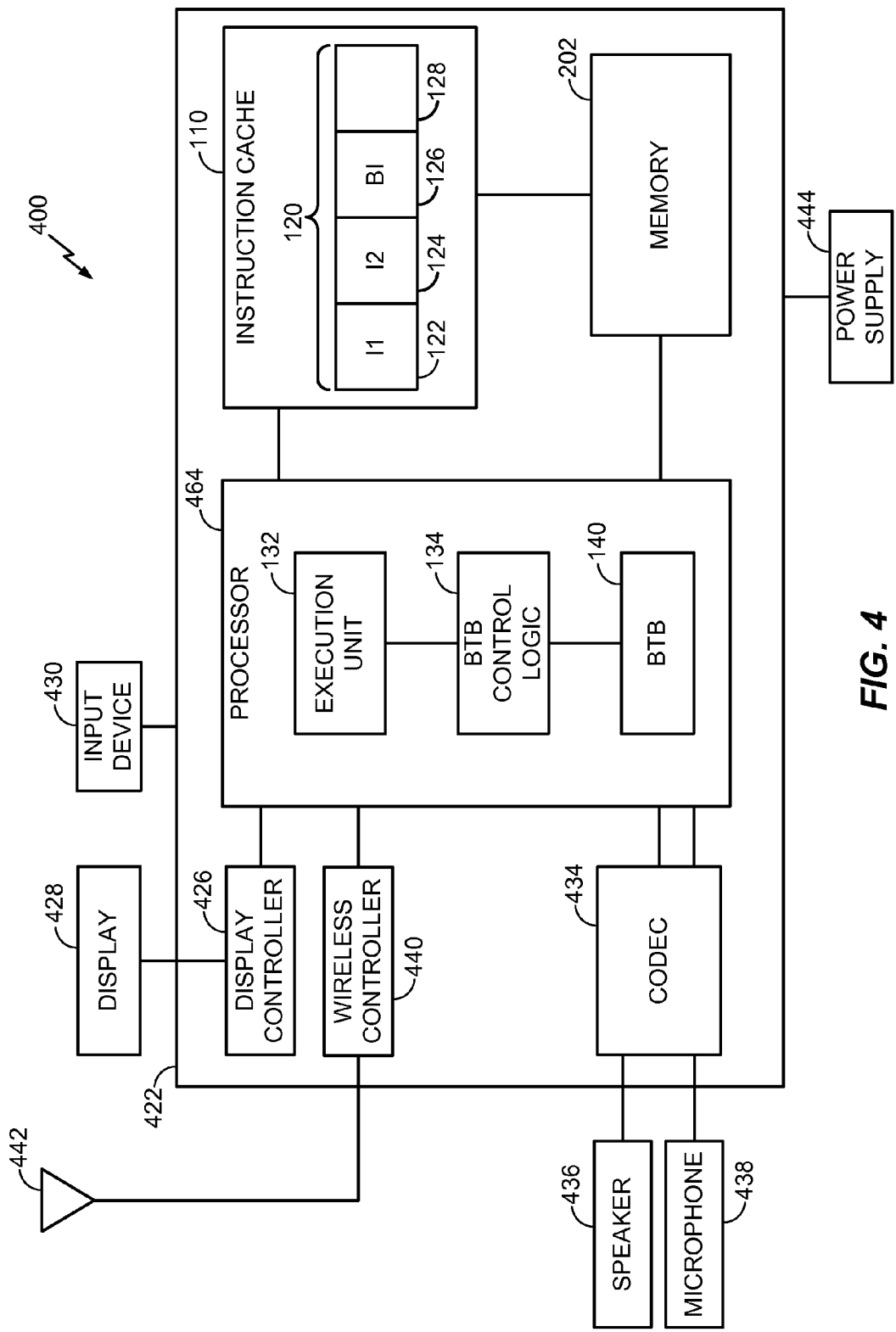
FIG. 4 is a block diagram of a wireless device including a processor operable to execute a branch instruction and to selectively write an entry into a branch target buffer.

Referring to FIG. 4, a block diagram of a particular illustrative embodiment of a wireless device that includes a processor coupled to an instruction cache including a branch instruction and operable to execute the branch instruction and to selectively write an entry into a branch target buffer is depicted and generally designated 400. The device 400 includes a processor 464 coupled to an instruction cache 110 and to a memory 202. The instruction cache 110 may include a cache line 120 having multiple instructions. In a particular embodiment, the maximum number of instructions in the cache line 120 may correspond to the fetch latency of the processor 464. For example, the fetch latency of the processor may be 4 instructions. Thus, the cache line 120 may have a maximum of 4 instructions (i.e., optimum number of instructions to prevent stalling in the pipeline). In alternate embodiments, the maximum number of instructions and fetch latency may differ. The illustrative cache line 120 may include 3 instructions (i.e., instructions I1, I2, and BI). Alternately, the memory 202 may be coupled to the instruction cache and may store the instructions (I1, I2, and BI) and transmit the instructions to the instruction cache 110.

The processor 464 may include a plurality of execution units (e.g., including execution unit 132 of FIGS. 1-2) that may receive and process the instructions I1, I2, and BI. The processor 464 may also include the BTB control logic 134 and the BTB 140. During operation, the processor 464 may execute the branch instruction BI at the execution unit 132. The execution unit 132 may determine that the branch is taken and may compute the target address of the taken branch. The BTB control logic 134 may be configured to selectively write an entry into the BTB 140. For example, the BTB control logic 134 may compare the number of instructions (e.g., 3 instructions) in the cache line 120 to a threshold. In a particular embodiment, the threshold may be based on the fetch latency of the processor 464 (e.g., 4 instructions). Upon determining that the branch is taken and that the number of instructions is less than the threshold, the BTB control logic 134 may write an entry into the BTB 140. The entry may include the branch instruction BI address and the target address.

FIG. 4 also shows a display controller 426 that is coupled to the processor 464 and to a display 428. A coder/decoder (CODEC) 434 can also be coupled to the processor 464. A speaker 436 and a microphone 438 can be coupled to the CODEC 434.

FIG. 4 also indicates that a wireless controller 440 can be coupled to the processor 464 and to a wireless antenna 442. In a particular embodiment, the processor 464, the display controller 426, the memory 202, the instruction cache 110, CODEC 434, and the wireless controller 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the wireless antenna 442, and the power supply 444 are external to the system-on-chip device 422. However, each of the display 428, the input device 430, the speaker 436, the microphone 438, the wireless antenna 442, and the power supply 444 can be coupled to a component of the system-on-chip device 422, such as an interface or a controller.

It should be noted that although FIG. 4 depicts a wireless communications device, the processor 464 and the memory 202 may also be integrated into other electronic devices, such as a set top box, a music player, a video player, an entertainment unit, a navigation device, a personal digital assistant (PDA), a fixed location data unit, or a computer.

In conjunction with the described embodiments, an apparatus is disclosed that includes means for executing a branch instruction and determining if a branch is taken. For example, the means for executing may include the execution unit 132 of FIGS. 1, 2, and 4, one or more of the execution units 220, 222, and 224 of FIG. 2, the processor 464 of FIG. 4, one or more devices configured to execute a branch instruction, or any combination thereof.

The apparatus may also include means for evaluating a number of instructions associated with the branch instruction. For example, the means for evaluating may include the BTB control logic 134 of FIGS. 1, 2, and 4, the processor 464 of FIG. 4, one or more devices configured to evaluate a number of instructions associated with the branch instruction, or any combination thereof.

The apparatus may also include means for selectively writing an entry into a branch target buffer that corresponds to the taken branch upon determining that the branch is taken and responsive to determining that the number of instructions is less than a threshold. For example, the means for selectively writing may include the BTB control logic 134 of FIGS. 1, 2, and 4, the processor 464 of FIG. 4, one or more devices configured to process an instruction packet, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of controlling execution of instructions at a processor, the method comprising:
   executing a branch instruction and determining if a branch is taken;
   evaluating a number of instructions in a cache line, of a plurality of cache lines of an instruction cache, that includes the branch instruction; and
   upon determining that the branch is taken, selectively writing an entry into a branch target buffer that corresponds to the taken branch responsive to determining that the number of instructions is less than a threshold.

2. The method of claim 1, wherein the threshold is determined based on a fetch latency of the processor.

3. The method of claim 1, wherein the branch target buffer is not written for the taken branch when the number of instructions associated with the branch instruction is greater than or equal to the threshold.

4. The method of claim 1, wherein the entry includes an address corresponding to the branch instruction and a target address corresponding to the taken branch.

5. The method of claim 4, further comprising:
after writing the entry into the branch target buffer, fetching a line of instructions that includes the branch instruction; and
upon determining that the branch instruction corresponds to the entry in the branch target buffer, fetching the target address corresponding to the taken branch.

6. An apparatus comprising:
a branch target buffer;
an instruction cache, having a plurality of cache lines, that stores a plurality of instructions including a branch instruction; and
a processor to execute the branch instruction, the processor comprising:
control logic to:
evaluate a plurality of instructions including the branch instruction fetched from the instruction cache and determine if a branch is taken;
upon determining that the branch is taken, selectively write an entry into the branch target buffer that corresponds to the taken branch responsive to determining that a number of instructions in a cache line, of the plurality of cache lines, that includes the branch instruction fetched from the instruction cache is less than a threshold.

7. The apparatus of claim 6, wherein the threshold is determined based on a fetch latency of the processor.

8. The apparatus of claim 6, wherein the branch target buffer is not written for the taken branch when the number of instructions is greater than or equal to the threshold.

9. The apparatus of claim 6, wherein the entry includes an address corresponding to the branch instruction and a target address corresponding to the taken branch.

10. The apparatus of claim 9, wherein the control logic is further configured to:
fetch a line of instructions that includes the branch instruction, after writing the entry into the branch target buffer; and
fetch the target address corresponding to the taken branch, upon determining that the branch instruction corresponds to the entry in the branch target buffer.

11. An apparatus comprising:
means for executing a branch instruction and determining if a branch is taken;
means for evaluating a number of instructions in a cache line, of a plurality of cache lines of an instruction cache, that includes the branch instruction; and
means for selectively writing an entry into a branch target buffer that corresponds to the taken branch upon determining that the branch is taken and responsive to determining that the number of instructions is less than a threshold.

12. The apparatus of claim 11, wherein the threshold is determined based on a fetch latency of the means for executing.

13. The apparatus of claim 11, wherein the entry includes an address corresponding to the branch instruction and a target address corresponding to the taken branch.

14. A non-transitory computer-readable medium including program code that, when executed by a processor, causes the processor to:
execute a branch instruction and determine if a branch is taken;
evaluate a number of instructions in a cache line, of a plurality of cache lines of an instruction cache, that includes the branch instruction; and
upon determining that the branch is taken, selectively write an entry into a branch target buffer that corresponds to the taken branch responsive to determining that the number of instructions is less than a threshold.

15. The non-transitory computer-readable medium of claim 14, wherein the threshold is determined based on a fetch latency of the processor, and wherein the branch target buffer is not written for the taken branch when the number of instructions is greater than or equal to the threshold.

16. The non-transitory computer-readable medium of claim 14, wherein the entry includes an address corresponding to the branch instruction and a target address corresponding to the taken branch.

* * * * *